(12) United States Patent
Cary et al.

(10) Patent No.: US 9,456,249 B2
(45) Date of Patent: Sep. 27, 2016

(54) MULTIDIMENSIONAL NAVIGATOR

(71) Applicant: Cable Television Laboratories, Inc., Louisville, CO (US)

(72) Inventors: Judson D. Cary, Denver, CO (US); Stephen Glennon, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 438 days.

(21) Appl. No.: 13/929,719

(22) Filed: Jun. 27, 2013

(65) Prior Publication Data

US 2015/0006503 A1 Jan. 1, 2015

(51) Int. Cl.
*H04N 21/475* (2011.01)
*G06F 17/30* (2006.01)

(52) U.S. Cl.
CPC .... *H04N 21/4755* (2013.01); *G06F 17/30554* (2013.01); *G06F 17/30864* (2013.01); *G06F 17/30867* (2013.01); *G06F 17/30899* (2013.01)

(58) Field of Classification Search
CPC .. G06Q 50/01; G06Q 30/02; G06Q 30/0267; G06Q 30/0256; G06Q 30/0201; G06F 17/30867; G06F 17/3089; G06F 17/30554; G06F 17/30705; G06F 17/30873; G06F 17/30696; G06F 17/30905; G06F 17/30994; G06F 17/3005; G06F 3/0482; G06F 3/0481; G06F 2203/04804; H04L 41/22; H04L 65/4084; H04N 5/44543; H04N 21/4828; H04N 21/482; H04N 21/8133; H04N 5/445; H04N 19/30; H04N 19/187; H04N 19/172; H04N 19/33; H04N 5/44591
See application file for complete search history.

(56) References Cited

U.S. PATENT DOCUMENTS

| 6,009,459 | A  | * | 12/1999 | Belfiore | G06F 17/30887 707/999.01 |
|---|---|---|---|---|---|
| 7,996,865 | B2 | * | 8/2011 | Choi | 725/40 |
| 2007/0005590 | A1 | * | 1/2007 | Thrasher | 707/5 |
| 2007/0074252 | A1 | * | 3/2007 | Nazarian et al. | 725/46 |
| 2011/0196864 | A1 | * | 8/2011 | Mason et al. | 707/728 |

* cited by examiner

*Primary Examiner* — Benjamin R Bruckart
*Assistant Examiner* — Krista A Contino Saumby
(74) *Attorney, Agent, or Firm* — Great Lakes Intellectual Property, PLLC.

(57) ABSTRACT

A multidimensional navigator configured to facilitate navigation to electronic content is contemplated. The navigator may include a plurality of dimensions and/or levels whereby each level displays electronic content available for navigation. The electronic content identified within each level may be arranged in a fisheye configuration comprising a plurality of rings where each ring identifies electronic content associated with a different resource.

9 Claims, 6 Drawing Sheets

MULTIDIMENSIONAL NAVIGATOR

TECHNICAL FIELD

The present invention relates to navigational interfaces, such as but not necessarily limited to a multidimensional navigator configured to facilitate user navigation of electronic content.

BACKGROUND

Locating and navigating to electronic content can be problematic, particularly when there is an abundance of available content. Navigation of Web-based content, such as that delivered or accessed through webpages, may be eased with the use of a search engine. The search engine may perform a keyword search of available webpages to identify those having content related to a search term. The search engine may return the corresponding search results within a webpage having a plurality of links to the related content. The links may be arranged in an order of relevance such that a link deemed to be the most relevant by the search engine is provided at a top of the webpage and additional links are thereafter listed according to their individual relevance. Typically, a user may select a link from this first set of search results to view a first piece of content. From the first piece of content, the user may then formulate subsequent search terms based on the first piece of content, that reveal subsequent search results, with links to subsequent pieces of content. Thus, in a top-down step-wise, or linear fashion the user may explore the contents of the Internet in general, or various sub-spaces thereof. This navigation is typical for search engines for search of webpages on the Internet in general, as well as defined sub-spaces of the Internet, e.g., Wikipedia, USPTO. For example, a typical user of Wikipedia may search on a first term, then subsequently link to highlighted words within the Wikipedia page that leads to other Wikipedia pages in a sequential manner.

This top-down, sequential arrangement of the search results according to search-term or keyword relevance may fail to adequately identify a resource or piece of content associated with an initial search of webpages. While a user may quickly identify an initial webpage, or list of content items, deemed to be the most relevant, the user may be less likely to quickly ascertain whether the corresponding webpages are associated with desirable resources, and their overall relationship to one another. In particular, the user may prefer navigating search results in a more holistic or relational manner based in part on content that may be remote in relation to an initial term. In addition, such search results of available content may be based on results from a plurality of resources. Accordingly, one non-limiting aspect of the present invention contemplates a need to allow a user to quickly and simultaneously view content from a search, including remote content and content from different resources, based off of an initial search term, rather than a long sequential series of searches.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
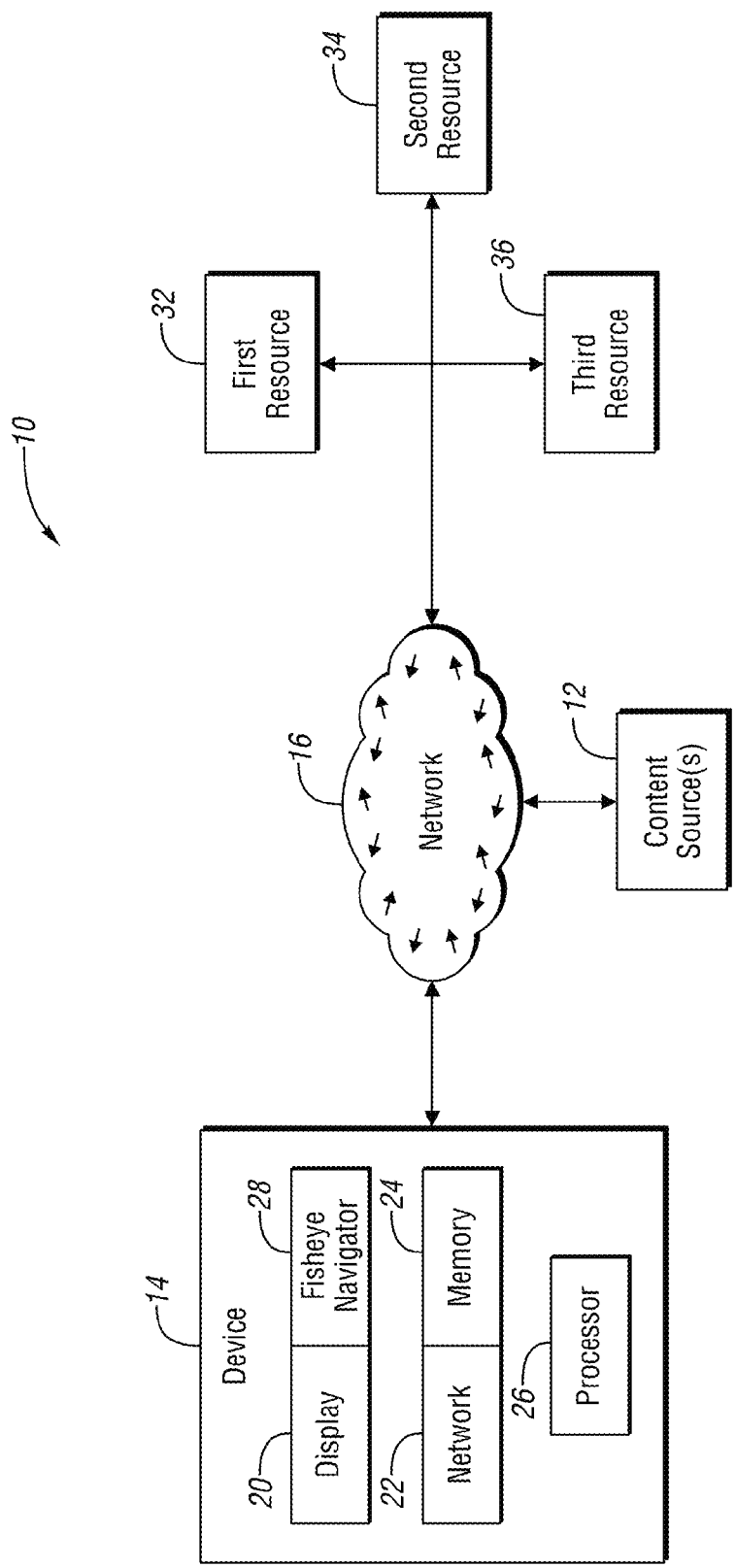
FIGS. 1-2 illustrate systems for navigating electronic content in accordance with one non-limiting aspect of the present invention.

FIG. 1 illustrates a system 10 for navigating electronic content in accordance with one non-limiting aspect of the present invention. The electronic content may be any type of content, media, data, information or other electronically transmissible services capable of being sourced from one or more content sources 12 to a device 14 with signaling carried over a network 16. The network 16 may correspond with the Internet, a public/private network or other media through which one or more content sources 12 may transmit content to the device 14 by way of wired and/or or wireless communications. The number of content sources 12 available to the device 14 and/or the pieces of content or other transmissible items available from the content sources 12 may be relatively high. The device 14 may include a display/touchscreen 20, a network interface 22, a computer-readable medium/memory 24 and a processor 26 operable to facilitate navigating the available content with a fisheye navigator 28. The fisheye navigator 28 may be a graphical user interface (GUI), a human-machine interface (HMI), application programming interface (API), or other interface capable of being manipulated according to user interactions with the display 20 and/or manipulation of other features associated with the device 14, including a mouse, keyboard, touchscreen, gesture-based, or other such devices.

Figure 2:
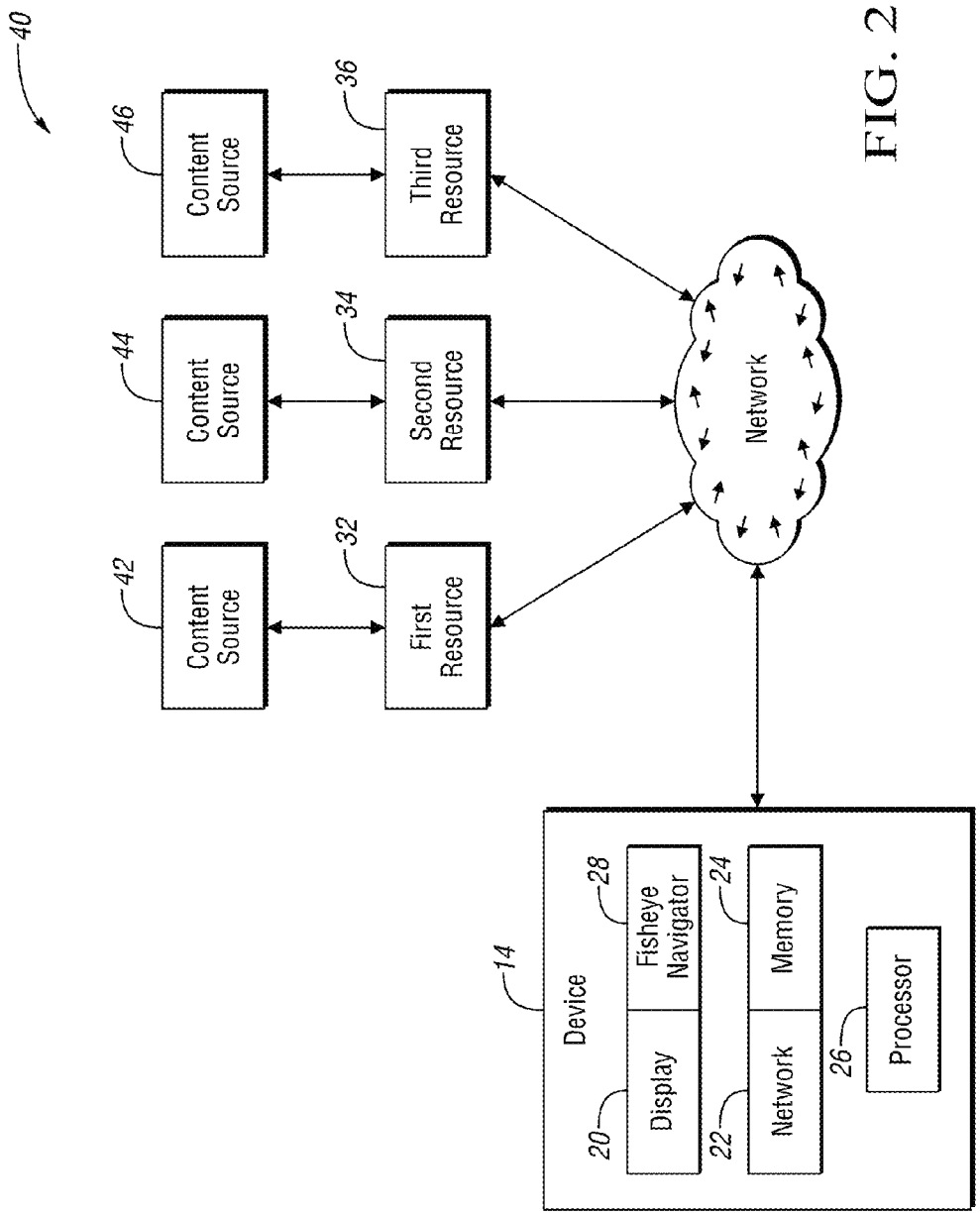

The fisheye navigator 28 may be a computer program product, an application or other software constructed configured to enable user search/selection of available content, and optionally, subsequent navigation to selected content. The fisheye navigator 28 may be configured to present the available content in a multi-dimensional format as a function of search results obtained from a plurality of resources 32, 34, 36. A first resource 32, a second resource 34 and a third resource 36 are shown for exemplary purposes as the number of relied upon resources 32, 34, 36 may be limitless and/or vary depending on the type or nature of the content being presented and/or other search restraints and limitations. The first, second and third resources 32, 34, 36 may be search engines, databases or other information repositories configured to track, monitor, tabulate, analyze, list or otherwise identify content available from the content sources 12. Resources 32, 34, 36 may be viewed as a service or portal. For example, a resource 32, 34, 36 may be the Google database, the Bing database or other such webpage search engines. Alternatively, the resources 32, 34, 36 may combine, for example, a variety of resources such as Amazon, Barnes and Noble, IMdB, and a local movie time/locations listings database. The fisheye navigator 28 may be configured to consult different resources 32, 34, 36 depending on the nature of the search term, such as but not limited to resources related to webpages, books, movie/television programming, parts catalogs, social networks, etc. While the resources 32, 34, 36 are shown to be unassociated with the content sources 12, the resources 32, 34, 36 may be content sources 12 and/or dedicated search engines or services for a particular content source 12, e.g., a content source that is unavailable to the other resources. FIG. 2 illustrates system 40 for navigating electronic content one or more content sources 42, 44, 46 are accessible to a selected one or more of resources 32, 34, 36 in accordance with one non-limiting aspect of the present invention.

Figure 3:
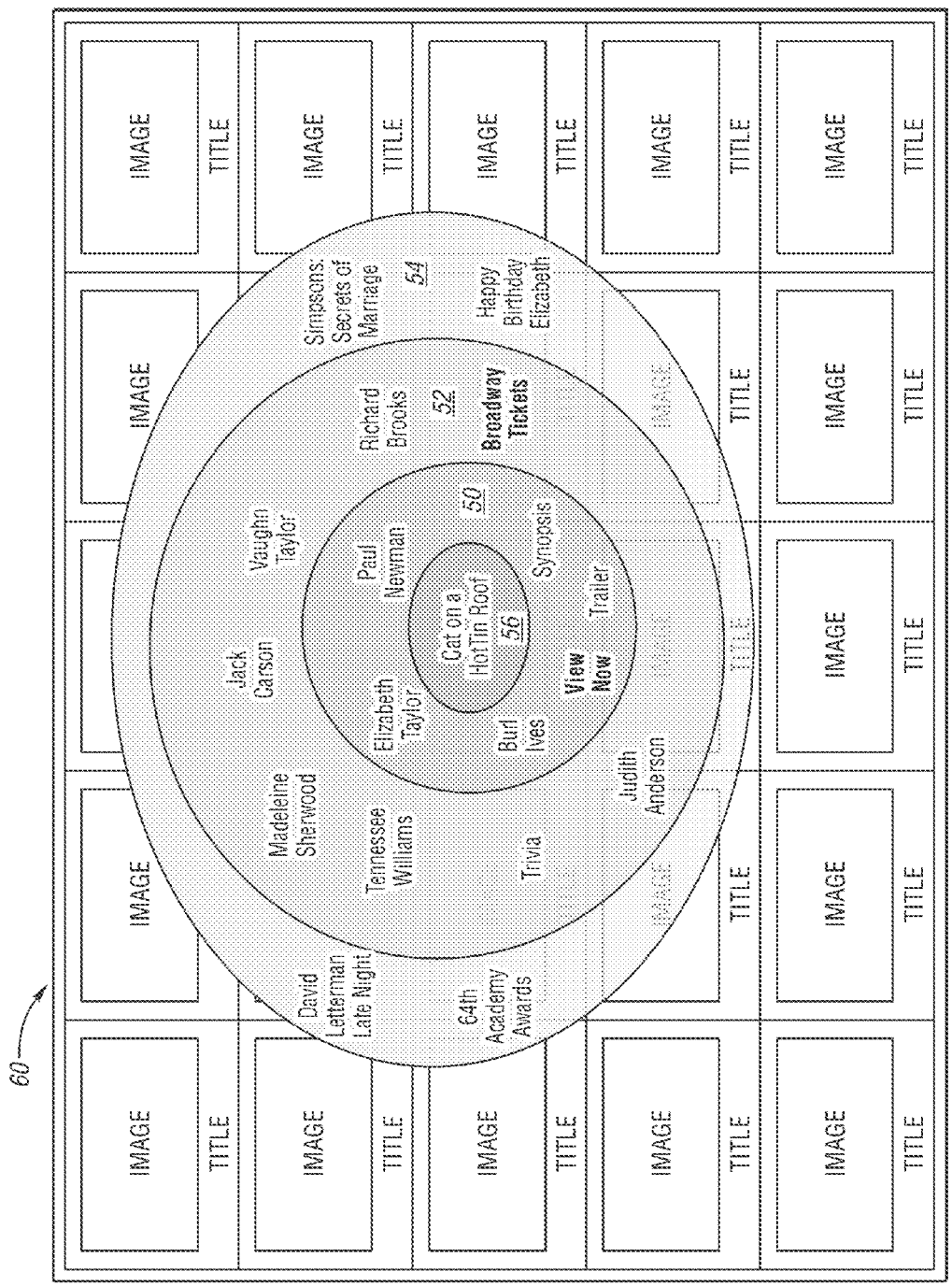
FIG. 3 illustrates a fisheye navigator display in accordance with one non-limiting aspect of the present invention.

FIG. 3 illustrates the fisheye navigator 28 in accordance with one non-limiting aspect of the present invention. The fisheye navigator 28 may be configured to present content for selection as a function of a search term, item selection, or other received information. The content presented for selection may be generated in a multi-dimensional manner where multiple levels of the fisheye navigator 28 display related content in order to ease user navigation. The multiple levels may be arranged as a plurality of rings 50, 52, 54 concentrically positioned relative to a center portion 56 used to identify the search term. In this example, the search term is shown to correspond with the movie titled "Cat on a Hot Tin Roof" with the search results of each ring 50, 52, 54 outwardly thereof successively varying in relation to the search term. The relation of each ring may correspond, from innermost ring 50 to each successive ring 52, 54 moving outward, to content that is highly related or correlated to the search term in the center 56, to more remote content. Thus, with aspect of the invention, the user is able to see remote or relational content that may not be revealed in a typical initial webpage search. The content of may be associated with the corresponding one of the plurality of resources 32, 34, 36 being relied upon to generate the search results for the particular ring 50, 52, 54. For example, an innermost ring 50 may relate to the first resource 32, a second ring 52 may relate to the second resource 34, a third ring 54 may relate to the third resource 36 with continuance of this sequence depending on the number of rings/resources being displayed.

In the example shown in FIG. 3, fisheye navigation of the movie "Cat on a Hot Tin Roof" is shown. Selection of "Cat on a Hot Tin Roof" may come from various tiles or titles of movies in a movie navigation screen on a computer, tablet, TV, etc. Other movie titles are shown in the background, with Cat On a Hot Tin Roof selected and exploded into an overlay on a background screen 60. In a first ring 50 the major actors are shown—Elizabeth Taylor, Paul Newman, Burl Ives. Also shown are the movie trailer and the storyline, and, in this example an advertisement or link to a VOD asset. In a second ring 52, some of the supporting actors are shown—Richard Brooks, Jack Carson, Judith Anderson, Madeleine Sherwood, Vaughn Taylor. Also shown in the second ring 52 is a link to "trivia", and, another advertisement to purchase Broadway movie tickets. Content sources and content identifiers from these first two rings 50, 52 may come from a typical movie database such as IMdB, Amazon, FLixter, Rotten Tomatoes, etc. Moving outward, content sources and content identifiers become more remote in relation to the initial search term. In a third ring 54, information that is not related to the movie/search item "Cat on a Hot Tin Roof" itself might be displayed. For example, other movies in the same genre, or movies that are often associated with "Cat on a Hot Tim Roof" because of common actors or playwrights are shown—Whose Afraid of Virgina Woolfe, A Streetcar Named Desire, The Long Hot Summer, Giant, Gone with the Wind, All About Eve, Night of the Iguana. This information in the third ring 54 may come from a similar resource or an alternative resource. For example, such information may come from a search of Amazon and drawn from "frequently bought together" listing or a "those who bought this, also liked this". For movies, recommendation engines such as Jinni might be used to populate the third ring 54. Content that is more remotely related to the initial search term might be displayed the farther out—the $64^{th}$ Academy Awards Ceremony clip, a Simpson's episode parody of Cat on a Hot Tin Roof, a Late Show with David Letterman that featured Elizabeth Taylor, A Happy Birthday Elizabeth tribute, etc. This information in Ring 4 may come from, for example, a more general Internet search on the term "Cat on a Hot Tin Roof" using, for example, Google, Bing, or other search engines. Thus, using the present invention, a user is presented with a wide range of information that is both closely related to the initial search term, and more remote, all in one display. Opportunities for advertising and sale of related goods and services may also be interspersed.

Content identifiers may be included within each ring 50, 52, 54 to identify the content uncovered as part of the corresponding search results. Each ring 50, 52, 54 may correspond with a different set of search results generated from searching a different one or more of the plurality of resources 32, 34, 36. The fisheye navigator 28 is not necessary limited to each ring 50, 52, 54 being associated with a different resource and fully contemplates multiple rings 50, 52, 54 including content identifiers uncovered from the same one or more of the plurality of resources 32, 34, 36. The content identifiers may be arranged in such a multi-dimensional manner in order to quickly draw the user's attention to relationship of the rings 50, 52, 54, and/or plurality of resources 32, 34, 36 to the search term. A user may specify a preference for the ordering of the rings 50, 52, 54 and/or the resources 32, 34, 36 being used to populate the rings 50, 52, 54 in order to further facilitate navigational ease. The number of content identifiers included within each ring 50, 52, 54 may vary depending on spatial constraints of the corresponding ring 50, 52, 54, i.e., the outer rings may have more space and therefore more room for additional content identifiers than the more inner rings. This fact may lend itself to the easy display of more remote content identifiers in the more remote rings; that is, more remote content (in relation to the initial search term) is likely to be hierarchically or exponentially related to the initial search term.

In the event more search results are identified for one or more of the rings 50, 52, 54 than that which can be displayed, a relevancy assessment may be performed to facilitate display of the content identifiers deemed to be most relevant to the search term. Alternatively, an indication that of additional content identifiers exist, e.g., ". . . " may be made. In the event the search results uncover an insufficient number of content identifiers to populate an entire area of one of the rings, openings may be included with the corresponding ring and/or the spatial arrangement of content identifiers within that ring 50, 52, 54 may be adjusted to present a uniform appearance. Also, advertisements or other features may be identified within the rings 50, 52, 54 to facilitate generating revenue and/or offering content or other services to the user. A plurality of additional buttons or selection menus may be provided around an exterior of the outer ring to offer additional content or to perform other navigational related operations. In one example, the illustrated fisheye navigator 28 may be provided through a cable-television device, such as a set top box or a second screen application, to facilitate navigating television related content. The content identifiers included within the fisheye navigator 28 may be those corresponding with television or movie related content available or related to the search term. The plurality of buttons included around the exterior of the fisheye navigator 28 may relate to video-on-demand (VOD), movies, or other programs in may be selected for searching, or viewing. In other words, the fisheye navigator 28 may be an overlay on a more traditional two-dimensional guide or listing of content on a TV, or on the Internet where additional visual representations (images) may appear behind the fisheye navigator 28. Optionally, the fisheye navigator 28 may be transparent or partially transparent in order to permit partial viewing of covered images. The overlaid fisheye navigator 28 may be useful in facilitating manipulation of an overlaid VOD guide or electronic programming guide (EPG) 60, which may be tied to a settop box (STB) or other device having capabilities to access content from additional content sources 12. Selection of a corresponding visual representation in the fisheye navigator 28 may result in automatic engagement of the overlaid interface 60, such as ordering of a VOD asset or changes to the displayed content sources (e.g., navigation to another page of the guide 60). Likewise, the fisheye navigator 28 can be an overlay on a typical webpage of text or an e-book.

One non-limiting aspect of the present invention contemplates facilitating navigation of search results in a manner that is convenient and easily understood by a user. The described fisheye navigator 28 is believed to facilitate this by enabling multiple searches to be conducted utilizing information associated with one or more resources 32, 34, 36 with the results of those searches being simultaneously displayed and easily recognizable. The fisheye navigator 28 may be quickly beneficial in ameliorating the number of clicks or operations a user may otherwise be required to perform in order to generate corresponding search results, i.e., the user of the present invention is no longer required to repeatedly provide the search term and/or repeatedly direct the corresponding search. The fisheye navigator 28 may be beneficial in allowing the user to input his initial search term one time and the fisheye navigator system thereafter automatically performs a plurality of searches and displays the corresponding search results without the user having to repeatedly click icons or performing other repetitive input related operations. The content identifiers generally have some relation to the initial search item, albeit more remote as the user views the outer rings, and, as noted above advertising can also be inserted, which may, or may not be related to the initial search term. The device 14 may automatically navigate to content selected from within the fisheye navigator 28 and/or direct other devices to facilitate user access to the corresponding content.

Figure 4:
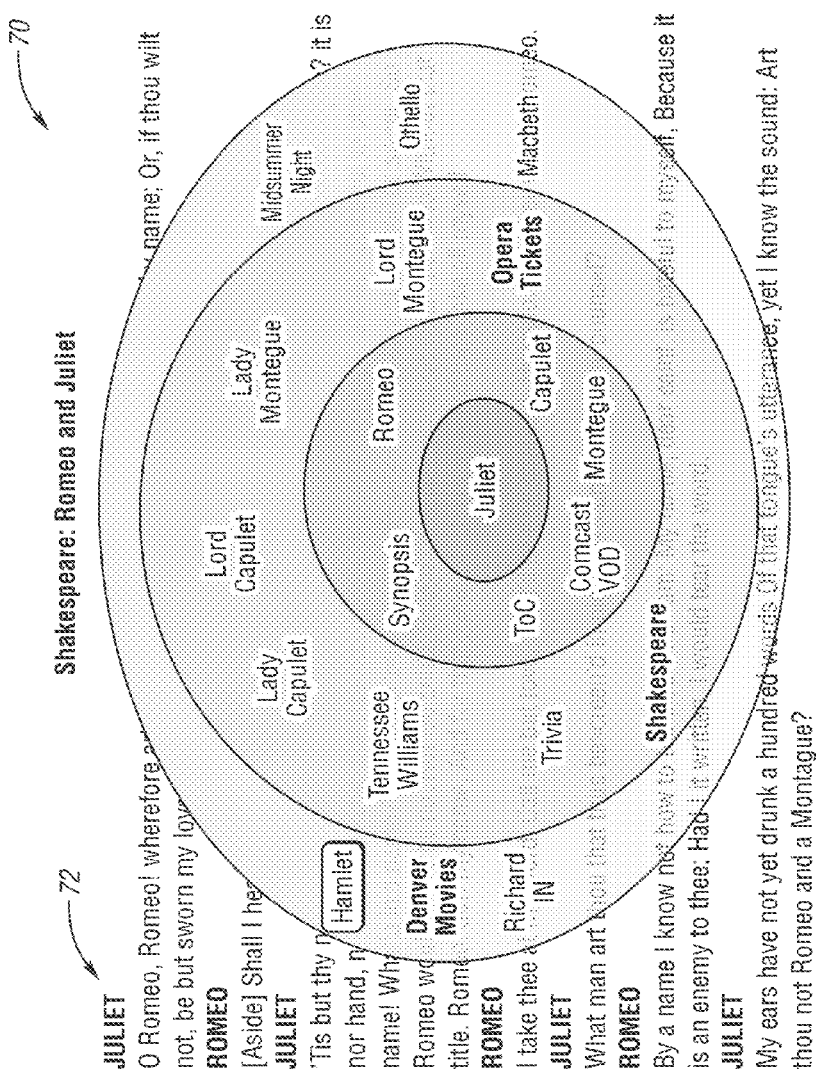
FIGS. 4-5 illustrate a fisheye navigator display in accordance with non-limiting aspect of the present invention.
Figure 5:
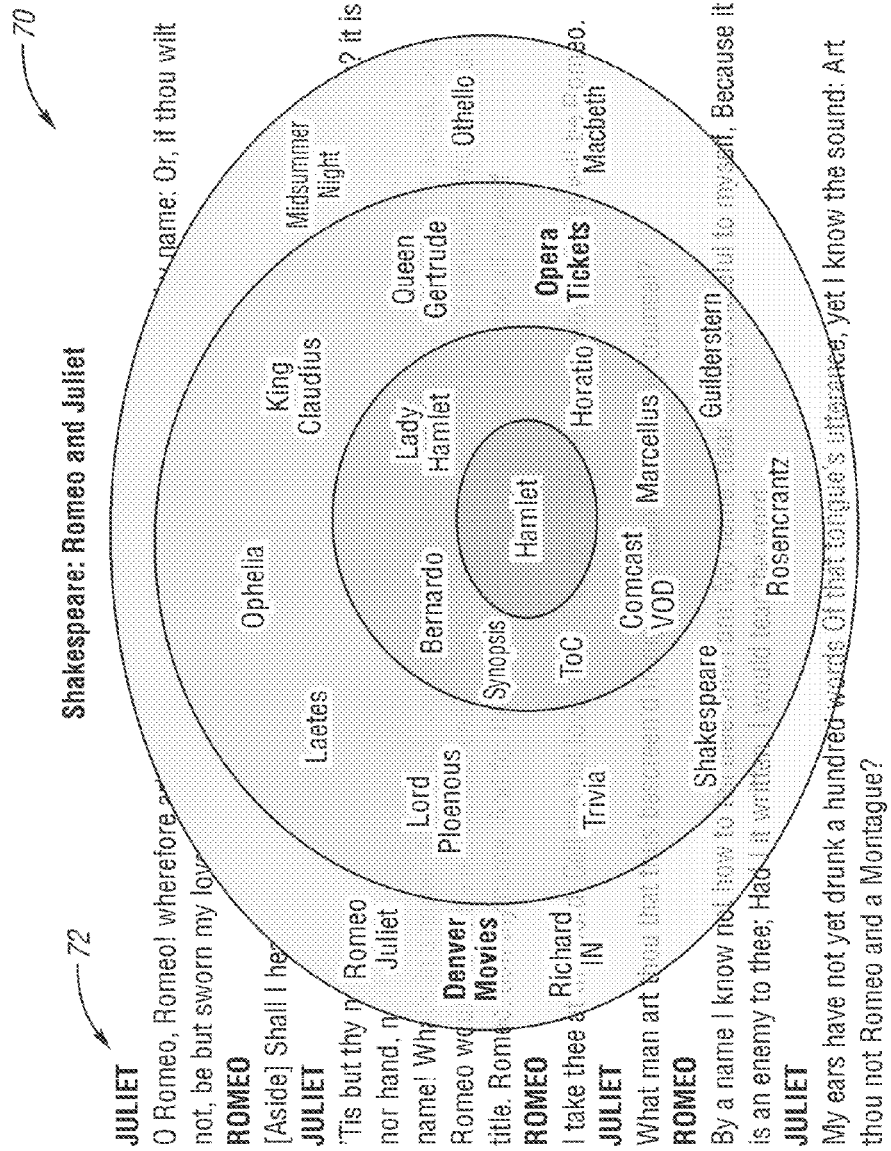

Optionally, instead of navigating to a selected one of the content identifiers, the fisheye navigator 28 may also be configured to perform a re-focusing operation where content identifiers selected from within a first fisheye navigator may become the new initial search term for searches displayed within a second fisheye navigator search. FIGS. 4 and 5 illustrate use of a fisheye navigator 70 while reading text, for example in an e-book 72 of Romeo and Juliet. An initial selection of the "Juliet" as the search term within the fisheye navigator 70 is shown in FIG. 4. The fisheye navigator 70 is presented as an overlay to the actual text 72 of the play below. In FIG. 5, the user has navigated from Juliet as a first search term, selected "Hamlet" as a second search term, and, in FIG. 5, changed the focus of the fisheye navigator, and all surrounding content identifiers to those associated with "Hamlet." In this example the underlying e-book text 72 of "Romero and Juliet" may, or may not change also to the play "Hamlet" The control of the fisheye navigator 70 to immediately access the content or to perform a re-focusing operation may be based on user interaction with the device 14. The fisheye navigator 70 may be configured to perform the re-focusing operation in the event a user performs a tap-and-hold operation where a magnifying effect is provided over the selected content identifier. The tap-and-hold operation may be beneficial in allowing the user to easily perform the re-focusing without having to perform multiple clicks and without having to enter the search term, i.e., the fisheye navigator 70 may automatically determine the search term from the highlighted content identifier. The fisheye navigator 70 may be configured to immediately access the content (e.g., via a webpage URL link) instead of performing the re-focusing in response to an operation other than the tap-and-hold operation, such as in response to a single click or single tap of the content identifier. In a touch screen implementation of the fisheye navigator 70, the user may slide their finger across the content identifiers, traversing the various rings, but keeping contact with the screen. Stopping at a selected content identifier and lifting the finger selects that item, and the fisheye navigator 70 navigates to the content behind the content identifier. Alternatively, if the user pauses for more than a given time on a content identifier, e.g., 3 seconds, the content identifier becomes new focus of a new search with the fisheye navigator 70, with rings and new content identifiers correspondingly shown in relation to that new search item.

Figure 6:
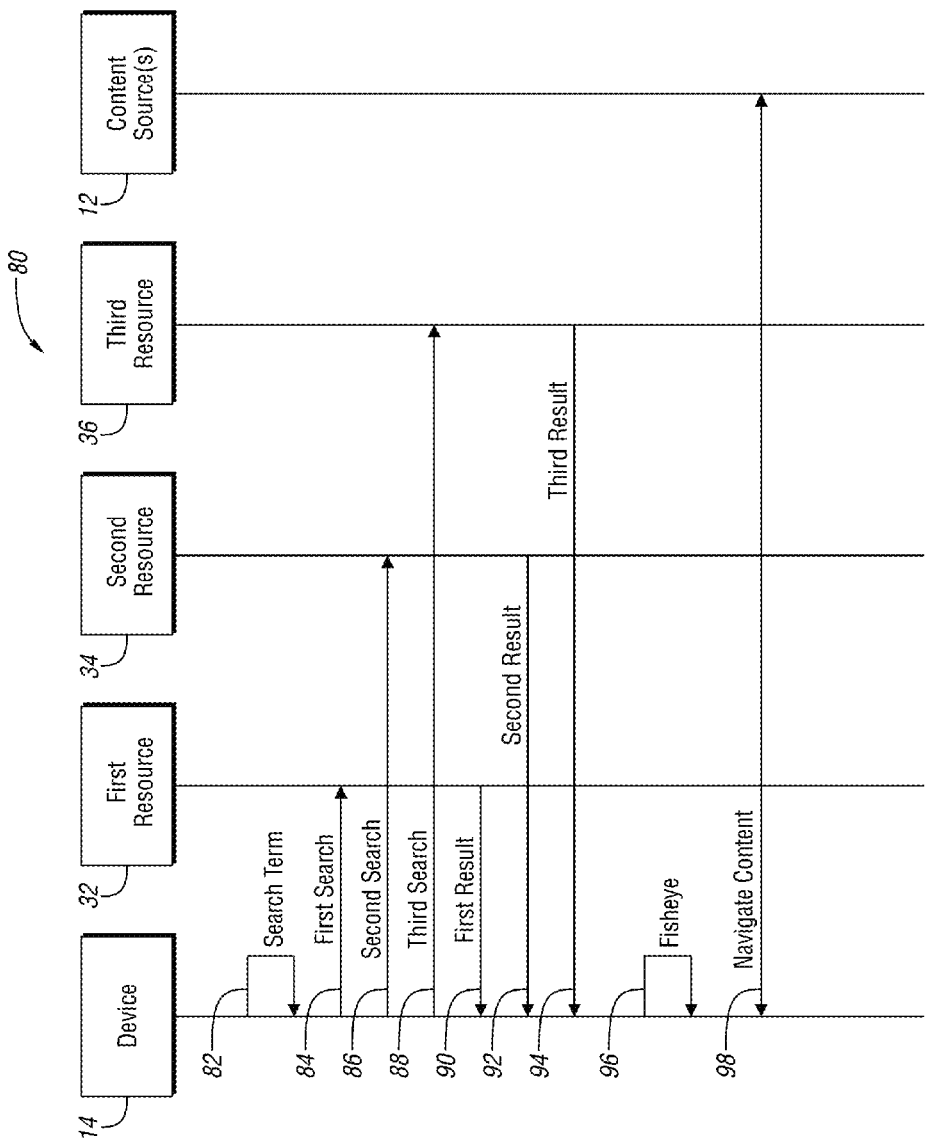
FIG. 6 illustrates a messaging diagram for a method of multidimensional navigation in accordance with one non-limiting aspect of the present invention.

FIG. 6 illustrates a messaging diagram 80 for a method of multidimensional navigation in accordance with one non-limiting aspect of the present invention. The method is described with respect to the above-described system 10 and fisheye navigator 28, however, this is done for exemplary purposes and without necessarily intending to limit the present invention to the above described features and processes. The multidimensional navigation may begin with identification of a search term 82. The search term may be identified by the device 14 in response to user inputs or other information communicated thereto. In response to identifying the search term, the fisheye navigator 28 and/or other feature of the device 14 or a device in remote communication there with, may automatically generate a plurality of searches 84, 86, 88. The searches 84, 86, 88 may be generated by transmitting the search term via a search request to a plurality of resources 32, 34, 36, which for exemplary purposes are illustrated with respect to transmitting a first search request 84 to the first resource 32, a second search request 86 to the second resource 34 and a third search request 88 to the third resource 36. The resources 32, 34, 36 identified to receive the search requests 84, 86, 88 may be selected or determined based on their relation to the search term.

The relation of the resources 32, 34, 36 to the search term may be determined in a manner that provides some variability in the search results presented to the user. By selecting resources 32, 34, 36 having varying or different relations to the search term, the fisheye navigator 28 may collect search results from different resources with different relevancy to the search term, i.e., by displaying search results potentially having less relevancy to the search term due to the search result being uncovered from a resource 32, 34, 36 that is more remotely or tangentially related to the search term. Keep in mind that the varying search results can all come from one resource, e.g., Google or Bing or other search engines. The varying search results may be generated from performing an initial search based on the search term.

Then, taking the top N (e.g., 5) hits, the search engine can generate secondary search terms based on the web pages of the top N hits, to perform a secondary search. Continuing, the top M hits from the secondary search can be used to generate search terms for a tertiary search, and so on. Alternatively, a heuristic or predictive search approach can be used. That is, based on the initial search term, a search engine resource associated with the fisheye navigator 28 can predict how a typical user would perform sequential searches. For example, in the prior art, a search for a movie title might be followed by a sequential search for reviews and a trailer, then a sequential search for show times and locations. Using the fisheye navigator to present results for a movie title, a first ring is populated with content identifiers indicating synopsis, main actors, director, etc. generated from a movie database such as IMdb, Flixter, EIDR, or other resources. A second ring is populated with content identifiers indicating more remote information such as related movies, "those who viewed this also liked X" etc. generated from a separate section of the movie database, or a recommendations engine. A third ring is populated with show times and location content identifiers generated from a local/geographic movie listings database and/or the local TV movie listings, including video-on-demand titles, e.g., denver.mr-movietimes.com, comcast.net. Predicative and heuristic searching is well known in the art and multiple techniques may be employed.

As noted above, advertising and/or paid placement of search results can be accommodated in the fisheye navigator 28. Advertising and paid placement of search results is well known in the art.

As the search results are presented to the user, the relation to the initial search term may be more remotely related to the initial term, and/or relate to the initial search term in a different manner. But, using the fisheye navigator, the user is able to see the relationship of the varying content identifiers displayed, and the user does not need to perform multiple serial searches.

The consulted resources 32, 34, 36 may provide the search results in a search result message 90, 92, 94, which is shown to correspond with a first search result 90, a second search result 92 and a third search result 94. The search results 90, 92, 94 may be tabulated or otherwise processed by the fisheye navigator 28 in order to facilitate their simultaneous display. The results may be communicated with typical application program interfaces or APIs that provide access to various search resources. The fisheye navigator 28 may be configured to an assessment of the relation of each search result to user preferences or other criteria used to specify the rings or other levels within which the corresponding search results are to be displayed. While concentrically arranged rings are shown to demarcate the resource relationships to the search term, the present invention is not necessarily so limited and fully contemplates other hierarchical configurations or other arrangements where the relation of resources to search term may be demarcated or otherwise presented to the user.

A fisheye process 96 may correspond with the device 14 displaying the fisheye navigator to the user to facilitate navigation of the search results. Subsequent user interaction with the fisheye navigator may be used to facilitate further navigation or searching within the search results and or navigating the device or other element associated with the device to selected content. In the event tap-and-hold or other operation is performed indicating a desire to perform a new search from a selected content identifier, the multidimensional fisheye navigation process may repeat by returning to the determination of the new search term. This may include performing additional searches and re-focusing the fisheye navigator 28 to the content identifier selected as part of the fisheye process. In the event a click or other operations performed indicating desired to navigate to a selected content identifier, a navigate content operation 98 may be performed. The navigate content operation 98 may correspond with the device 14 contacting one or more of the content sources for access to the desired content. The information necessary to facilitate contacting the content sources and/or or accessing the desired content may be determined from information included within the search results 90, 92, 94 and/or other information provided to the device 14. This navigation from a content identifier to the actual content may include the URL of a web page.

As supported above, one non-limiting aspect of the present invention contemplates use of n-dimensional Fisheye Navigator (maybe invoked via a double tap-and-hold, or could be a cursor or mouse gesture too) operable on a phone, tablet, computer, etc. to bring up concentric circles of navigable links related to a word/subject of focus. A first concentric ring dimension may contain, for example, links highly related or corresponding to the initial search term. A Second concentric ring dimension may contain links "further out" (defined by examples below), and so on. By sliding your finger (already in a hold position), the links of various depth/dimension can be navigated from the single fisheye navigator. Rather than multiple searches, multiple pages and multiple clicks or page-by-page in sequential exploration on the Web, the present invention allows multiple search results to be displayed from a single initial search term.

One non-limiting aspect of the present in invention contemplates re-focusing a center of the "fisheye" as the user navigates around the rings. The re-focus effect may occur, for example, after pausing on an item for more than a few seconds, or by double tapping. This would then take the new item, make it the center of the "rings" and re-populate the concentric rings in various dimensions around the new focus item.

For navigation to a particular content identifier in the rings, a touch-sensitive or intelligent operation to permit navigation to a chosen identifier is used, i.e., go to the web page of that item in response to lifting a finger, tapping, clicking a mouse cursor, etc. Information to populate the "rings" of the Fisheye Navigator may come from many resources, as noted above, and in the examples below. One of the advantages of the Fisheye Navigator is the single fisheye displays links of multiple depth and multiple pages, all in one dimension/page, which may be beneficial in ameliorating a multi-click, multi-page search. Another advantage is that the format of concentric circles allows for the "outer" information, (which is likely more numerous), to be placed in "larger" rings where there is more screen real estate.

One non-limiting aspect of the present in invention contemplates advertisements being incorporated into the rings. And, as the "outer rings" may bring in information that would otherwise be buried down 6 levels, 6 clicks, and 6 sequential pages (and likely never viewed), such remote links might be monetized more readily as an advertiser would be willing to pay because the ad will be exposed, not buried.

One non-limiting aspect of the present in invention contemplates movie/TV navigation. This may include using, for example, a tablet as remote control, a movie (including the current movie displaying on the tablet, or on a big/second screen) can be highlighted (double-tap-and-hold, use right click, or other common selection gestures) to invoke the Fisheye Navigator. In a first concentric ring, links to items highly related to the movie itself are shown, e.g, major actors and the trailer—these are items, for example, in the target movie itself (but not required or limiting in this invention). In a next concentric circle, additional information might be shown—other actors, director, playright, trivia, etc., which may be metadata about the movie. The first two "rings" can get this information from, for example, Internet Movie Database (IMDb), Rotten Tomatoes, Flixter, or Entertainment Identifier Registry (EIDR). Use of common APIs to retrieve the data may be employed. A third "ring" may start to bring in "external" information, for example, top 10 films in the same genre, films with the same actors, films by the same director. This ring can also be populated by IMDB or EIDR, Rotten Tomatoes, Flixter, ("those who bought this also liked this . . . "), or a commercial recommendation engine (e.g., Jinni). A fourth "ring" might bring in information more remote based on a recommendation engine, or a more random search of the movie, or IMDB "related" information. Thus, each "ring" may have different resources of information and/or relation to the search term.

One non-limiting aspect of the present in invention contemplates booking reading. This may include using, for example, a tablet, a <<word>> or graphic can be highlighted (double-tap-and-hold; use right click, or other common selection gestures) to invoke the Fisheye Navigator. Not all words are "fisheye" enabled, just some; like hyperlinked words in text. In a first concentric ring, links to items highly related to the current book itself are shown, e.g., characters, Table of Contents, Synopsis (see e.g., a resource like Amazon books info, and use of common APIs to such information). In a next concentric circle, additional information might be shown—additional characters, author, etc., also available from Amazon, Barnes and Noble, etc. In a third concentric circle, books by same author might be shown (third party recommendation engine), etc. A third "ring" may start to bring in "external" information, for example, similar/parallel books, movies, plays, books in the same genre (see third party recommendations engine "those who bought", random search engine search on the book).

One non-limiting aspect of the present in invention contemplates Web page navigation. This may include certain words (or icon/graphic) in a web page being indicated for "fisheye" navigation (like hyperlinked words) whereby a double-tap-and-hold invokes the Fisheye Navigator. Here, a first ring might include, by default, a search engine defaults-like search defaults: wiki, pictures, "about", media (if relevant), etc. A second ring might include a "people also searched for" list. A third tier might include information derived from predictive or heuristic models that incorporate a "next page" analysis that goes beyond the "people also search for" but is also based on heuristic, predictive, and statistical models—i.e., the navigator/browser can predict where you are possibly going and show all such possible paths.

One non-limiting aspect of the present in invention contemplates a parts catalog navigation, e.g., for an airplane. This may include using, for example, a tablet or a larger screen or "smart glass" where one can navigate complex parts catalog using the Fisheye Navigator. A single part (e.g., a screw on the wing), can be highlighted (double-tap-and-hold) to invoke the Fisheye Navigator. In a first concentric ring, links to items that are directly connected to that part are shown (by part number, or by icon). In a next concentric ring the major subsystem that the part (screw) is a part of, plus the sister-subsytems might be shown. Next, the more major subsystems are shown (e.g., wing, gas tanks, engines). Next the even more major systems are shown (fuselage, fore, aft, landing gear). Overall, think of Table of Contents indentation "levels" that populate the rings.

One non-limiting aspect of the present in invention contemplates social network navigation. This may include a social network being represented by a hierarchical relational database. This hierarchy might be represented in the FishEye Navigator in: $1^{st}$ degree friends in a first ring, $2^{nd}$ degree friends in a second ring, $3^{rd}$ degree friends in a third ring, etc. Of course, given some large "friend" networks, the number of names that appear in each circle might be further limited by those most emailed or most navigated in order to narrow the friends displayed. Alternatively, and indication of additional friends may be show with ". . . " or some other indication.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of facilitating access to electronic content comprising:

receiving at a device having capabilities sufficient to access electronic content a first term from a user desiring to search for electronic content associated therewith;

generating at the device a plurality of search requests having searching information sufficient to facilitate searching for electronic content related to the first term;

transmitting the plurality of search requests from the device to a plurality of resources having or capable of searching for electronic content associated with the searching information included within a corresponding one of the plurality of search requests;

receiving at the device a plurality of search results each generated by a different one of the plurality of resources, each of the plurality of search results identifying electronic content uncovered as a result of a search for electronic content conducted by the corresponding one of the plurality of resources based on the searching information included in each received one of the plurality of search requests such that each resource conducts the corresponding search using a search term derived from the first term that is different from the search term used by each of the other resources;

arranging at the device two or more of the plurality of search results into a plurality of levels, each of the plurality of levels identifying the electronic content uncovered for the corresponding one of the plurality of searches;

arranging at the device each of the plurality of levels for simultaneous display within a fisheye navigator to facilitate user navigation of the electronic content, including displaying the fisheye navigator within a display associated with the device such that each of the plurality of levels displays the electronic content associated with a different one of the plurality of resources;

determining at the device a plurality of identifiers sufficient to visually represent the electronic content associated with the plurality of levels;

facilitating display of the plurality of identifiers within the fisheye navigator;

controlling the device to access the electronic content associated with one of the plurality of identifiers in response to the user interacting therewith;

arranging at the device the plurality of identifiers within one of a plurality of concentrically arranged rings, each one of the plurality of concentrically arranged rings corresponding with one of the first plurality of levels;

transmitting from the device an innermost ring search request of the plurality of search requests to one of the plurality of resources to perform an innermost ring search and an outermost ring search request of the plurality of search requests to a different one of the plurality of resources to perform an outermost ring search; and arranging the plurality of identifiers such that an innermost ring of the plurality of concentrically arranged rings corresponds with the electronic content uncovered as part of the innermost ring search and the plurality of identifiers included within an outermost ring correspond with electronic content uncovered as part of the outermost ring search; and wherein the innermost ring search is more closely related to the first term than the outermost ring search.

2. The method of claim 1 further comprising arranging the first plurality of identifiers such that an innermost ring of the plurality of concentrically arranged rings includes a least number of the plurality of identifiers and an outermost ring of the plurality of concentrically arranged rings includes a greatest number of the plurality of identifiers.

3. A computer program product embodied in a non-transitory medium, with a processor, to facilitate navigating to electronic content, with non-transitory instructions sufficient to facilitate:

determining a first search result, a second search result and a third search result respectively associated with a first search, a second search and a third search independently conducted according to a search term, the first, second and third search results each identifying electronic content available for navigation, the electronic content identified within the first search result being more closely related to the search term than the electronic content identified within the second and third search results and the electronic content identified within the second search result being more closely related to the search term than the electronic content identified within the third search result;

simultaneously displaying icons for at least a portion of the electronic content identified within the first, second and third search results respectively within a first ring, a second ring and a third ring of a fisheye navigator such that the first ring displays icons for the portion of electronic content identified in the first search result, the second ring displays icons for the portion of electronic content identified in the second search result and the third ring displays icons for the portion of electronic content identified in the third search result, the fisheye navigator facilitating user navigation to the electronic content upon selection of a corresponding one of the icons displayed in the first, second and third rings, wherein the fisheye navigator arranges the first ring to be an innermost ring, the second ring to surround the first ring and the third ring to surround the second ring with the search term being displayed in a middle of the first ring;

transmitting a first search request having a first term associated with the search term to a first resource, the first resource responsively:
i) performing the first search for the first term; and
ii) transmitting a first reply identifying the first search result;

transmitting a second search request having a second term associated with the search term to a second resource, the second resource being different than the first resource and responsively:
i) performing the second search for the second term; and
ii) transmitting a second reply identifying the second search result;

transmitting a third search request having a third term associated with the search term to a third resource, the third resource being different than the second resource and responsively:
i) Performing the third search for the third term; and
ii) transmitting a third reply identifying the third search result; and determining the first, second and third searches from the first, second and third replies; and generating the second and third terms to be different than the first term.

4. A device comprising:
a display;
a processor;
an application embodied in a non-transitory medium with the processor to facilitate navigating to electronic content identified within the display, the application including instructions sufficient to facilitate:
i) determining a first search result, a second search result and a third search result respectively associated with a first search, a second search and a third search independently conducted according to a search term, the first, second and third search results each identifying electronic content available for navigation, the electronic content identified within the first search result being more closely related to the search term than the electronic content identified within the second and third search results and the electronic content identified within the second search result being more closely related to the search term than the electronic content identified within the third search result;
ii) simultaneously displaying icons for at least a portion of the electronic content identified within the first, second and third search results respectively within a first ring, a second ring and a third ring of a fisheye navigator such that the first ring displays icons for the portion of electronic content identified in the first search result, the second ring displays icons for the portion of electronic content identified in the second search result and the third ring displays icons for the portion of electronic content identified in the third search result, the fisheye navigator facilitating user navigation to the electronic content upon selection of a corresponding one of the icons displayed in the first, second and third rings, wherein the fisheye navigator arranges the first ring to be an innermost ring, the second ring to surround the first ring and the third ring to surround the second ring with the search term being displayed in a middle of the first ring;
iii) transmitting a first search request having a first term associated with the search term to a first resource, the first resource responsively:
(1) performing the first search for the first term; and (2) transmitting a first reply identifying the first search result;

iv) transmitting a second search request having a second term associated with the search term to a second resource, the second resource being different than the first resource and responsively:
   (1) determining the second and third searches from the first, second and third replies; and
v) generating the second and third terms to be different than the first term.

5. The computer program product of claim 3 further comprising non-transitory instructions sufficient to facilitate generating the first term to be the same as the search term.

6. The computer program product of claim 5 further comprising non-transitory instructions sufficient to facilitate generating the second term as a function of the electronic content identified in the first search result.

7. The computer program product of claim 6 further comprising non-transitory instructions sufficient to facilitate generating the second term to include a secondary search term selected from one or more of an n number of top hits included in the first search result.

8. The computer program product of claim 7 further comprising non-transitory instructions sufficient to facilitate selecting the second term to be a most popular one of the n number of top hits included in the first search result and a third search term included as at least part of the third term to be a most popular one of an m number of top hits included in the second search result.

9. The computer program product of claim 3 further comprising non-transitory instructions sufficient to facilitate:

selecting the first resource to be a Web-based search engine such that the fisheye navigator navigates to the electronic content identified in the first search results through a web browser to access a corresponding webpage; and selecting the second resource to be a television service provider search engine such that the fisheye navigator navigates to the electronic content identified in the second search results through a set-top box (STB) to access a corresponding channel of a television service provider.

* * * * *